United States Patent [19]

Thorp et al.

[11] 4,014,569
[45] Mar. 29, 1977

[54] FLEXIBLE DUCTING JOINT
[75] Inventors: Peter Thorp, Hampton; George William Bycroft, Doncaster, both of England
[73] Assignee: Coal Industry (Patents) Limited, London, England
[22] Filed: Jan. 2, 1973
[21] Appl. No.: 320,552
[30] Foreign Application Priority Data
Jan. 24, 1972 United Kingdom .............. 03325/72
[52] U.S. Cl. .............................. 285/260; 285/423
[51] Int. Cl.$^2$ ........................................ F16L 31/00
[58] Field of Search ................. 285/260, 423, 374; 248/188, 188.5, 188.8; 2/270
[56] References Cited
UNITED STATES PATENTS

| | | | |
|---|---|---|---|
| 1,525,538 | 2/1925 | Evans | 285/260 |
| 2,911,237 | 11/1959 | Olson | 285/260 |
| 3,747,126 | 7/1973 | Hoagland | 2/270 |

FOREIGN PATENTS OR APPLICATIONS

| | | | |
|---|---|---|---|
| 492,798 | 4/1919 | France | 285/260 |
| 704,629 | 3/1941 | Germany | 285/260 |

Primary Examiner—Werner H. Schroeder
Assistant Examiner—Moshe I. Cohen
Attorney, Agent, or Firm—James C. Wray

[57] ABSTRACT

A joint is made between two lengths of flexible ducting by captivating a flexible resilient ring attached to one end of a length of the ducting between a pair of spaced parallel rings attached to the end of the other length of the ducting. The joint can be made by deforming the flexible ring and passing it into the end of the second length of ducting and then releasing it, when it is in position, so that due to its resilience it assumes its natural shape and is positioned between the pair of rings.

5 Claims, 5 Drawing Figures

FLEXIBLE DUCTING JOINT

BACKGROUND OF THE INVENTION

Flexible ducting is used in many mines for ventilation purposes and usually comprises a cloth tube which is supplied in lengths and joined between the lengths. Air is blown or drawn through the ducting to the required positions. In order for the ventilation to be efficient it is necessary that the ducting is substantially leakproof and that the joints are effective. The ducting itself is made from a fabric material such as nylon or terylene which is coated with a plastic material such as p.v.c. In certain cases the coating may also include anti static materials.

One form of jointing which has been used is that of two interlocking rings. At the end of each length of ducting the cuff has a flexible ring stitched to it. This can be squeezed so as to pass through an identical ring attached to an adjacent length of ducting. The first ring is then pulled back until it abuts behind the ring on the adjacent length. This type of jointing is cheap and is satisfactory as long as the ducting is continually in use and is not under longitudinal strain or subject to high pressure when the ends may step out of engagement. Also, when the pressure within the ducting falls and the ducting collapses the joints may come apart since one ring can fall back into the ducting and slip out of its adjacent end when ventilation is re-started.

Alternative forms of joint are known, for example from British Pat. Nos. 1,050,871 and 1,154,943 which use a draw string or the like to pull one end of the ducting tight round an adjacent end which is inserted into the first end. These alternative forms suffer from the disadvantages that since there are many pieces which are not integral with the ducting it is easy for one piece to become dislodged and lost and also that the cost of making the various pieces for the joint is relatively high. Furthermore, the drawstrings have been known to break and if the strings are pulled too tight they throttle the joint to reduce the size of the ducting at the joint. Added to these is the disadvantage that if the string is not secured sufficiently tightly or stretches the joint will be subject to a high leakage rate, or in the extreme case will part.

SUMMARY OF THE INVENTION

It is an object of the invention to provide a joint for coupling the ends or cuffs of lengths of flexible ducting which is cheap and easy to make and which does not require a number of loose and non-integral parts. It is also an object to provide a joint which is not liable to part when loss of pressure in the ducting occurs. It is a further object to provide a joint which is able easily to be assembled and taken apart without the use of tools.

To achieve these objects there is provided a length of flexible ducting which has a substantially parallel pair of rings secured to it at one of its ends, the first of said rings being attached to the extreme end of the ducting and the second of said rings being attached at a predetermined distance from said extreme end, the said predetermined distance being such as to be sufficient to retain between the rings a resilient ring of diameter substantially equal to the diameter of the said second ring and attached to one end of a second length of flexible ducting arranged to be passed into the first ducting and connected to it.

The invention also includes a joint made from such a length of ducting with a resilient ring of a second length of flexible ducting inserted into it with the resilient ring positioned between the two rings of the said pair.

The invention further includes a method of making the above joint by deforming the said resilient ring and passing it into the end of the first length of flexible ducting, positioning it between the rings of the said pair of rings and releasing it so that it assumes its natural shape and is held between the rings of the pair.

DETAILED DESCRIPTION OF THE INVENTION

Figure 1:
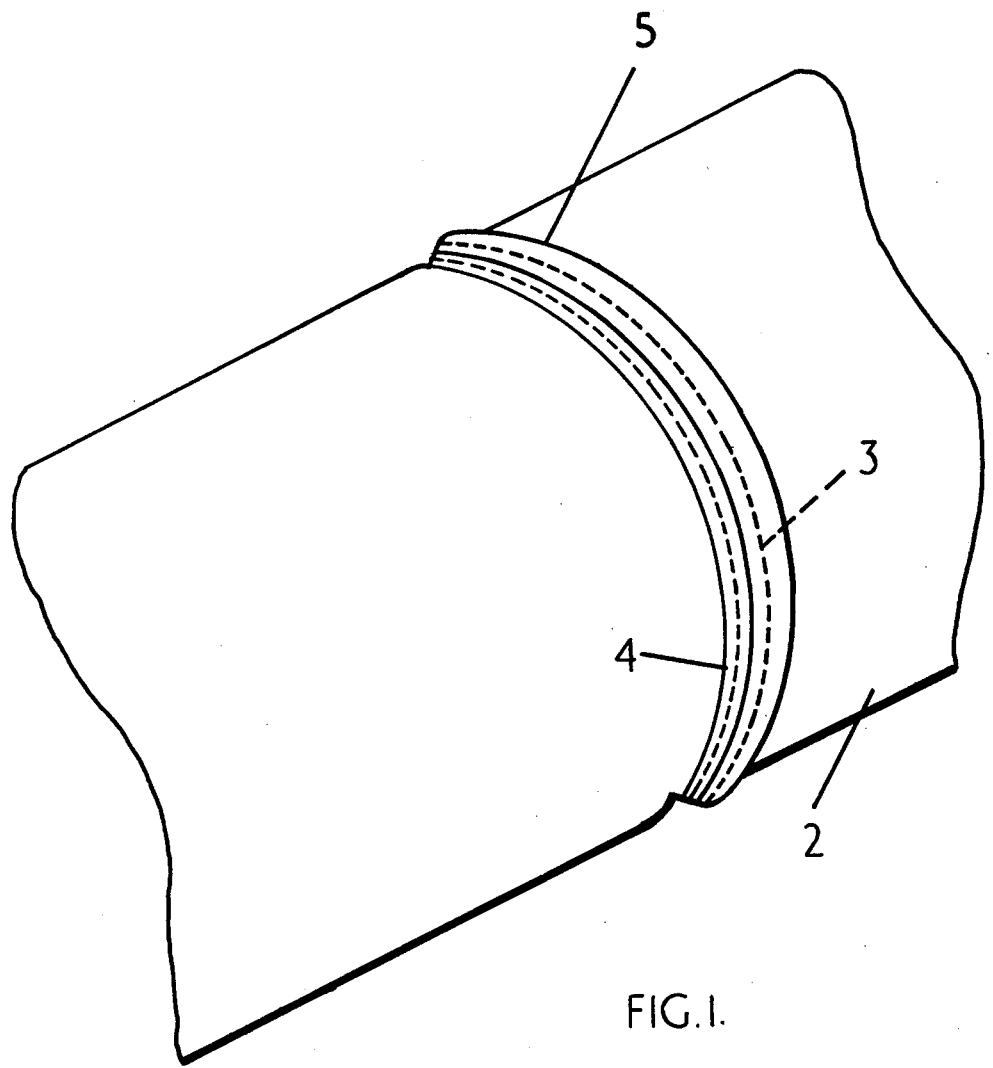
Figure 2:
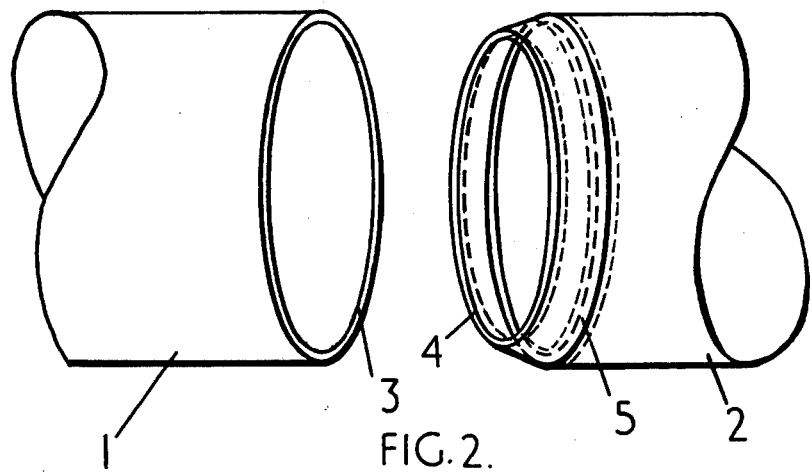
Figure 4:
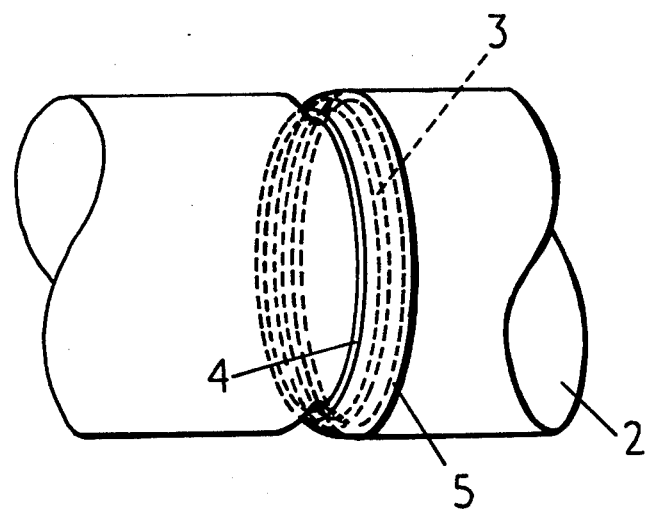
Figure 5:
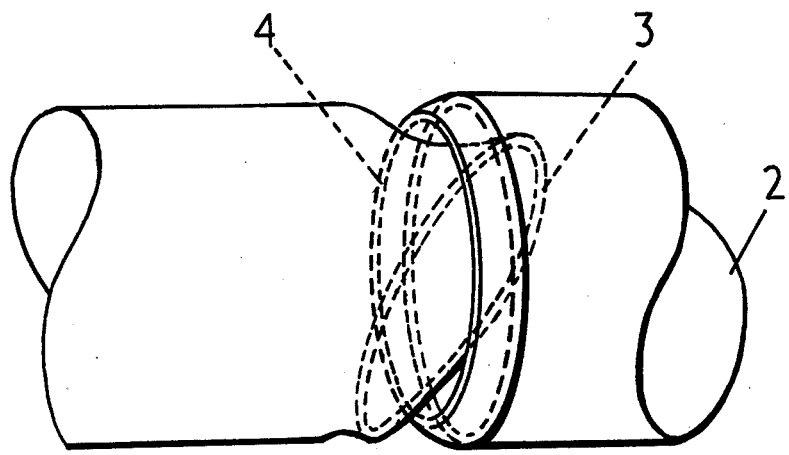

In order that the invention may be readily understood one embodiment of a joint of a flexible ducting in accordance with the invention and using the method thereof will now be described by way of example only with reference to the accompanying drawings. In the drawings FIG. 1 shows a perspective view of the joint, FIG. 2 shows the two ends of adjacent lengths of ducting prior to ducting, FIG. 3 shows the ends of FIG. 2 during jointing, FIG. 4 shows the completed joint and FIG. 5 shows how the join is disconnected.

FIGS. 2–5 are all side views.

Referring to the drawings two lengths of flexible ducting 1,2 made of p.v.c. coated nylon fabric each have rings secured to their ends. The ducting 1 has a ring 3 of flexible wire rope stitched to its cuff. The ducting 2 has a ring 4 stitched to the end of its cuff and a ring 5 stitched a short distance along the length of the ducting 2. The ring 5 is parallel to the ring 4. Both rings 4 and 5 are also made from steel rope. The rings 3 and 5 are of the same diameter whereas the ring 4 is of a slightly smaller diameter. The stitching on the ducting 2 which holds the rings 4 and 5 in position is arranged so that the rings present abutments on their facing sides.

Figure 3:
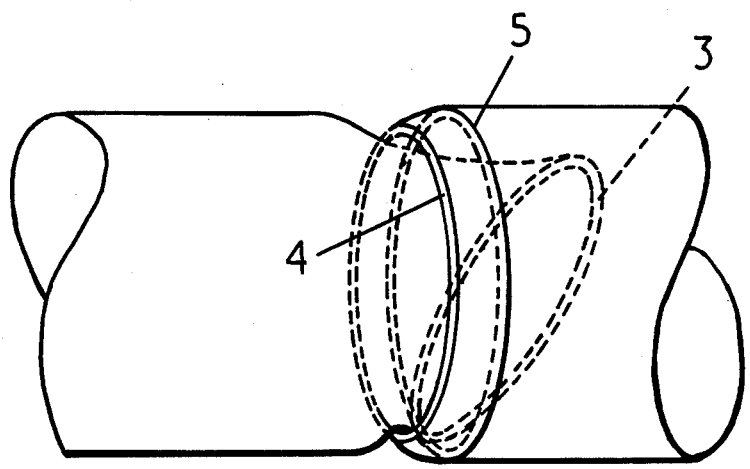

Referring now particularly to FIG. 3 the ring 3 of the ducting 1 is squeezed and passed into the ducting 2. Part of the ring 3 is positioned as shown between the rings 4 and 5 and the rest of the ring is then brought back so that the whole of the ring 3 is positioned between rings 4 and 5. The deforming pressure on ring 3 is released and the ring takes up a position as shown in FIG. 4 to complete the joint.

If the joint is to be disconnected this can be done easily by deforming the ring 3 and pulling the end of the ducting 1 out of the ducting 2 as shown in FIG. 5.

When air is blown through the ducting the joint is in tension and the ring 3 is held against the ring 4 to make a tight joint. Since the ring 4 is of a slightly smaller diameter than the ring 3 there is no risk at all of the joint springing. When the air pressure within the ducting falls, the joint does not collapse since the ring 3 is prevented by the ring 5 from falling into the ducting 2 and by the ring 4 from falling away from it.

The rings are simple to incorporate into the ducting ends and are themselves cheap in manufacture. There are no separate pieces which can get lost and it is unlikely that the parts will be easily damaged. Even if the rings are damaged to some extent, they may still operate successfully. The degree of air leakage is much less than in prior art types of joint.

In one typical construction of joint the rings 3 and 5 were 20 inches in diameter and the ring 4 was 19 inches in diameter. Rings 4 and 5 were spaced along the ducting 2 by a distance of 4 inches. The rings themselves were comprised of stranded wire of a total nominal thickness of ½ inch. In an alternative joint the rings 3 and 5 were 30 inches in diameter and the ring 4 was 28½ inches diameter. The spacing between rings 4 and 5 was 4 inches and the diameter of the rings was ½ inch.

The joint was able to operate extremely satisfactorily at normal mine ventilation pressures of 10–12 p.s.i. and was able to accept higher pressures of the order of 25 p.s.i. without any noticeable increase in air leakage.

It should be appreciated that the normal construction of a length of ducting will be such that one end of the ducting has a single ring 3 and the other end has a double ring 4,5. However, there is no reason why one length of ducting may be provided at both ends with single rings 3 and the next length of ducting with double rings 4,5 at each end.

The rings may be secured to the ducting by other means such as bonding with adhesives or welding if the material of the ducting is of a suitable content such as one with a high plastics content. Alternatively the rings can be placed in pockets on the ducting.

I claim:

1. A length of flexible ducting having open ends, a pair of rings secured to a first one of the ends, a first of the rings being attached at an extremity of the first end of the ducting and the second of the rings being attached to the ducting parallel to the first ring and at a predetermined distance from said extremity of the first end, the first ring of the pair of rings having a smaller diameter than the second ring of the pair of rings, whereby the said predetermined distance is such that a resilient ring attached to an end of a second length of flexible ducting can be retained between said first and second rings when positioned therebetween.

2. A length of flexible ducting according to claim 1, in which the rings are constructed from flexible and resilient material.

3. A length of flexible ducting according to claim 1, in which the first and second rings individually are secured to the ducting by stitching.

4. A joint between ends of two lengths of flexible ducting in which an end of a first one of the said lengths is provided with a ring of resilient flexible material and the end of a second one of the said lengths is provided with a pair of parallel rings, a first of the rings of the pair being permanently attached at an extremity of an end of the second length of flexible ducting and the second of the rings of the said pair being permanently attached to the ducting parallel to the first ring and at a distance from said extreme end; the first ring of the pair of rings having a smaller diameter than the diameter of the ring of resilient flexible material, the end of the first length of flexible ducting material being positioned within the end of the second length of flexible ducting material with the said ring of resilient flexible material being substantially parallel to and positioned between the rings of the said pair.

5. A method of joining two lengths of flexible ducting in which an end of a first one of the said lengths is provided with a ring of resilient flexible material and an end of a second one of the said lengths is provided with a permanently attached pair of parallel rings, a first of the rings of the pair being attached at an extremity of the end of the second length of flexible ducting and a second of the rings of the pair being attached parallel to and at a distance from the said extreme end, the first ring of the pair having a diameter smaller than the second ring, comprising the steps of deforming the ring of resilient flexible material and inserting it and the end of the said first length into the end of the second length, positioning the said ring between the first and second rings of the pair of rings of the second length and releasing the resilient flexible ring so that it reverts to its natural shape and is positioned between the first and second rings of said pair of rings within the second length of flexible ducting.

* * * * *